(12) United States Patent
Ikeda et al.

(10) Patent No.: US 8,932,379 B2
(45) Date of Patent: Jan. 13, 2015

(54) EXHAUST GAS PURIFICATION SYSTEM

(75) Inventors: Takashi Ikeda, Fujisawa (JP); Takayuki Mukunashi, Fujisawa (JP); Hiroyuki Ishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 87 days.

(21) Appl. No.: 13/703,259

(22) PCT Filed: Jun. 10, 2011

(86) PCT No.: PCT/JP2011/063323
§ 371 (c)(1),
(2), (4) Date: Dec. 10, 2012

(87) PCT Pub. No.: WO2011/155588
PCT Pub. Date: Dec. 15, 2011

(65) Prior Publication Data
US 2013/0081366 A1   Apr. 4, 2013

(30) Foreign Application Priority Data

Jun. 11, 2010  (JP) ................. 2010-134514

(51) Int. Cl.
*B01D 50/00* (2006.01)
*B01D 24/00* (2006.01)
(Continued)

(52) U.S. Cl.
CPC .......... *B01D 46/0063* (2013.01); *F01N 3/0253* (2013.01); *F02B 37/24* (2013.01); *F02D 41/0005* (2013.01); *F02D 41/0007* (2013.01); *F02D 41/0055* (2013.01);
(Continued)

(58) Field of Classification Search
CPC ..... F01N 9/002; F01B 37/24; F02D 41/0055; F02D 41/029; Y02T 10/40; Y02T 10/47
See application file for complete search history.

(56) References Cited

U.S. PATENT DOCUMENTS 6,829,890 B2 * 12/2004 Gui et al. ........................ 60/295
6,931,842 B2 *  8/2005 Ohtake et al. ................... 60/295
(Continued)

FOREIGN PATENT DOCUMENTS

JP       2004-44524      2/2004
JP       2004-68804      3/2004
(Continued)

OTHER PUBLICATIONS

International Search Report of Corresponding PCT Application PCT/JP2011/063323 mailed Sep. 13, 2011.
(Continued)

*Primary Examiner* — Amber Orlando
(74) *Attorney, Agent, or Firm* — Staas & Halsey LLP

(57) ABSTRACT

An exhaust gas purification system with which diesel particulate filter ("DPF") regeneration can be continued even when deceleration occurs during the DPF regeneration. The system includes a regeneration deceleration period intake/exhaust control unit that, when a vehicle decelerates during the DPF regeneration, increases an exhaust gas flow rate through an exhaust pipe by controlling respective openings of an exhaust gas recirculation ("EGR") device and an intake throttle and adjusting a turbocharging amount of a high pressure stage turbocharger.

16 Claims, 1 Drawing Sheet

(51) Int. Cl.
- *B01D 39/14* (2006.01)
- *B01D 39/06* (2006.01)
- *B01D 39/20* (2006.01)
- *B01D 46/00* (2006.01)
- *F01N 3/025* (2006.01)
- *F02B 37/24* (2006.01)
- *F02D 41/00* (2006.01)
- *F02D 41/02* (2006.01)
- *F02M 25/07* (2006.01)
- *F01N 9/00* (2006.01)
- *F02B 37/013* (2006.01)
- *B01D 46/42* (2006.01)
- *F01N 13/00* (2010.01)
- *F01N 3/10* (2006.01)

(52) U.S. Cl.
CPC ........ *F02D 41/029* (2013.01); *F02M 25/0711* (2013.01); *F02M 25/0718* (2013.01); *F01N 9/002* (2013.01); *F02B 37/013* (2013.01); *B01D 46/42* (2013.01); *F01N 13/0097* (2013.01); *F02D 2041/0017* (2013.01); *F02D 2041/0022* (2013.01); *Y02T 10/144* (2013.01); *Y02T 10/42* (2013.01); *Y02T 10/47* (2013.01); *F01N 3/103* (2013.01); *B01D 2279/30* (2013.01)
USPC .............. 55/282.3; 55/522; 55/523; 55/524; 422/169; 422/170; 422/171; 422/172; 422/177; 422/178; 422/179; 422/180; 422/181; 422/182

(56) References Cited

U.S. PATENT DOCUMENTS

| | | | |
|---|---|---|---|
| 8,037,675 B2 * | 10/2011 | Tahara et al. | 60/286 |
| 2004/0031262 A1 * | 2/2004 | Gui et al. | 60/285 |
| 2004/0103654 A1 * | 6/2004 | Ohtake et al. | 60/295 |
| 2007/0266701 A1 * | 11/2007 | Cheng | 60/295 |
| 2008/0006024 A1 * | 1/2008 | Tahara et al. | 60/274 |
| 2008/0209887 A1 * | 9/2008 | Hanari et al. | 60/277 |

FOREIGN PATENT DOCUMENTS

| | | |
|---|---|---|
| JP | 2004-190668 | 7/2004 |
| JP | 2006-189024 | 7/2006 |
| JP | 2009-167906 | 7/2009 |
| JP | 2010-106691 | 5/2010 |

OTHER PUBLICATIONS

Patent Abstracts of Japan, Publication No. 2004-068804, Published Mar. 4, 2004.
Patent Abstracts of Japan, Publication No. 2004-044524, Published Feb. 12, 2004.
Patent Abstracts of Japan, Publication No. 2006-189024, Published Jul. 20, 2006.
Patent Abstracts of Japan, Publication No. 2004-190668, Published Jul. 8, 2004.
Patent Abstracts of Japan, Publication No. 2010-106691, Published May 13, 2010.
Patent Abstracts of Japan, Publication No. 2009-167906, Published Jul. 30, 2009.
Written Opinion of the International Searching Authority mailed Sep. 13, 2011 in corresponding International Application No. PCT/JP2011/063323.

* cited by examiner

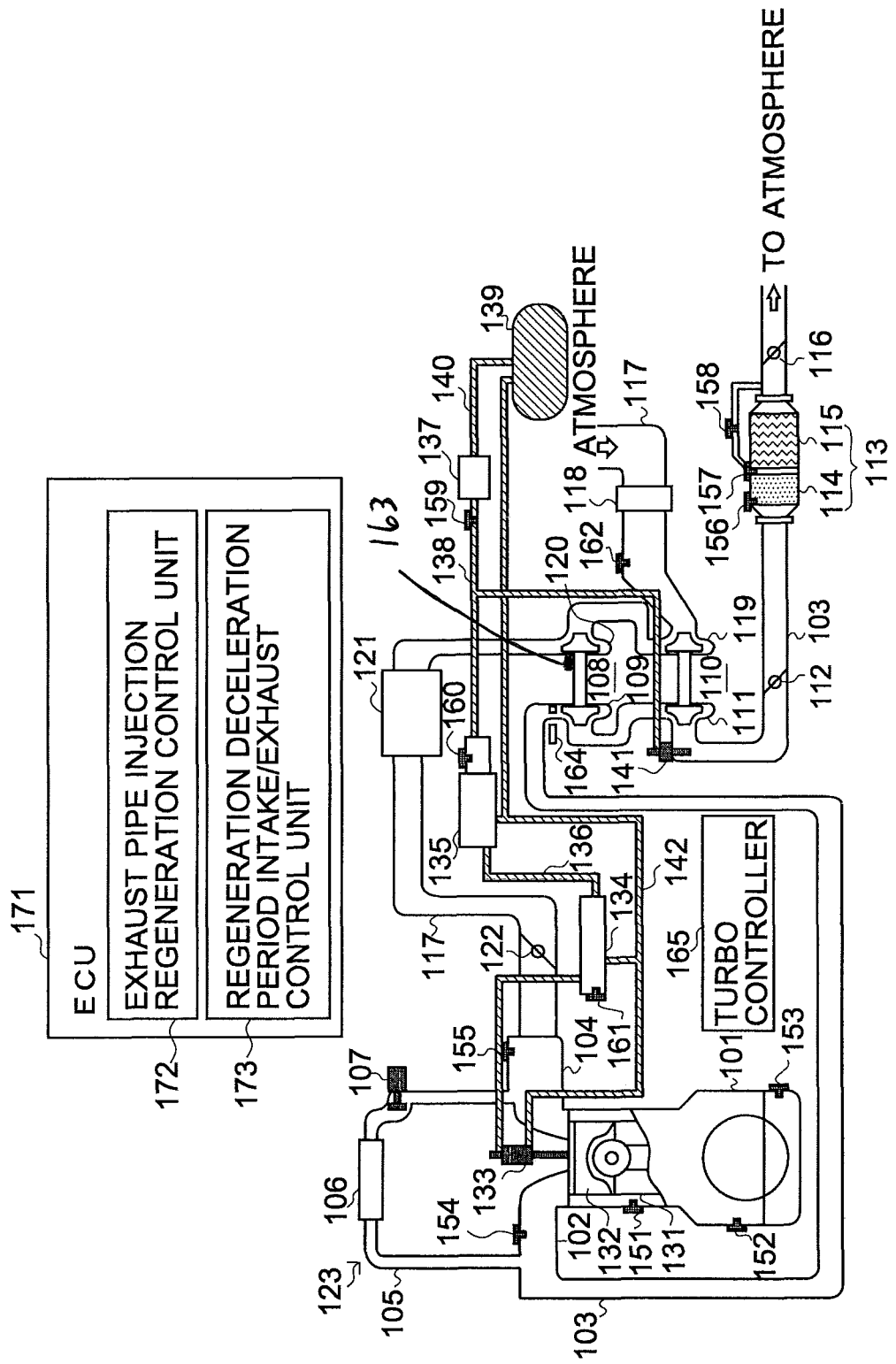

EXHAUST GAS PURIFICATION SYSTEM

CROSS-REFERENCE TO RELATED APPLICATIONS

This application claims the benefit of Japanese Patent Application No. 2010-134514, filed on Jun. 11, 2010, the contents of which is incorporated herein by reference, which serves as priority for PCT Application No. PCT/JP2011/063323, filed Jun. 10, 2011.

TECHNICAL FIELD

The present invention relates to an exhaust gas purification system that injects fuel for diesel particulate filter ("DPF") regeneration, and more particularly to an exhaust gas purification system with which DPF regeneration can be continued even when deceleration occurs during the DPF regeneration.

BACKGROUND

A DPF is provided in an exhaust pipe in order to purify exhaust gas from a diesel engine by removing particulate matter (to be referred to hereafter as PM) from the exhaust gas. The DPF collects the PM in a honeycomb structure formed from a porous ceramic. When the collected PM accumulates excessively, circulation of the exhaust gas is impaired, but by increasing an exhaust gas temperature, the PM collected in the DPF can be incinerated and removed. This operation is known as DPF regeneration.

In a conventional method for increasing the exhaust gas temperature to a temperature at which the PM can be incinerated, an oxidation catalyst (to be referred to hereafter as a DOC) constituted by platinum or the like is disposed upstream of the DPF, and the exhaust gas temperature is raised to an activation temperature of the DOC by increasing a fuel injection amount of a multi-injection, in which fuel injection is performed a plurality of times to obtain propulsive force in the engine. Next, a DPF regeneration fuel injection (a post injection) is performed at an appropriate crank angle such that hydrocarbon (to be referred to hereafter as HC) is supplied to the DOC by the post injection, and the exhaust gas temperature is raised by oxidation heat from the HC. When the post injection is performed, however, oil dilution, in which the injected fuel intermixes with lubricating oil of the engine and thereby diluted, occurs. Further, when unburned fuel from the post injection intermixes with exhaust gas recirculation (to be referred to as EGR hereafter), a performance of an EGR cooler deteriorates and a defect occurs in a piston ring.

Hence, in recent years, a method of supplying HC to the DOC by providing a new device in the exhaust pipe and performing an exhaust pipe injection to inject fuel into the exhaust pipe such that the exhaust gas temperature is raised by the oxidation heat of the HC has been investigated.

PRIOR ART DOCUMENT

PRIOR ART DOCUMENT

Patent Documents

Patent Document 1: Japanese Patent Application Publication No. 2010-106691

SUMMARY OF THE INVENTION

In the exhaust pipe injection, in contrast to the post injection in which fuel is injected into a cylinder, an injection timing is determined irrespective of the crank angle, and a fuel injection amount is also determined arbitrarily. However, exhaust pipe injection technology is new, and therefore a large amount of time must be expended on experiments for determining an injection timing and a fuel injection amount at which the exhaust gas temperature can be raised effectively and without wasting fuel. Post injection technology, on the other hand, has already been established through many experiments, and therefore appropriate injection timings and injection fuel amounts have been mapped. Hence, the present inventors considered setting a target injection amount of a fuel injection amount for an exhaust pipe injection on the basis a target injection amount for a post injection. A target injection amount map for the exhaust pipe injection was set such that an amount of fuel corresponding to a fuel injection amount post-injected into each cylinder during a single combustion cycle of the engine is injected in the exhaust pipe injection within a predetermined time corresponding to a single combustion cycle. By converting the established injection timing and target injection amount of the post injection for use during the exhaust pipe injection in this manner rather than starting from a so-called zero base, the amount of time expended on experiments can be shortened.

Incidentally, post injections are conventionally prohibited during vehicle deceleration in which an accelerator pedal is released (not depressed), or in other words engine braking. The reason for this is that during engine braking, the amount of fuel injected in the multi-injection is small, and therefore the exhaust gas temperature decreases such that the DOC is cooled by the exhaust gas. Accordingly, the temperature of the DOC falls below the activation temperature, and as a result, the post-injected fuel is not oxidized by the DOC but discharged from the exhaust pipe as white smoke. Hence, when an engine brake is activated during DPF regeneration, the DPF regeneration must be interrupted.

In response to this problem, the present inventors proposed a temperature maintaining mode in which the DPF and the DOC are held at high temperatures during engine braking. In the temperature maintaining mode, a fresh air intake is reduced by reducing an opening of an intake throttle, and at the same time, an amount of exhaust gas flowing into the exhaust pipe is reduced by increasing an opening of an EGR device such that a larger amount of exhaust gas is recirculated to the engine. As a result, the temperatures of the DPF and the DOC do not decrease from the high temperatures thereof prior to the start of engine braking. Thus, the DOC can be maintained at the activation temperature for a fixed amount of time. Further, the DPF is held at the PM incineration temperature, and therefore a rapid reduction in a regeneration temperature can be prevented during engine braking.

However, when the exhaust pipe injection is performed while the temperature maintaining mode is set, the regeneration temperature increases due to the lack of fresh air, and as a result, the DPF and an SCR device provided downstream thereof may suffer melt damage. A possible cause of an increase in the temperatures of the DPF and the DOC is that the amount of exhaust gas flowing into the exhaust pipe is small and therefore the exhaust gas is retained in the exhaust pipe, while the injected fuel does not flow toward the DOC and is therefore ignited in the exhaust pipe. Further, in a case where control is performed to detect an inlet temperature of the DPF and increase the exhaust pipe injection amount until the DPF reaches the regeneration temperature, since the exhaust gas does not flow, an amount of time required for the injected fuel to reach the DOC increases, and therefore the inlet temperature of the DPF increases at a response delay relative to the fuel injection. Accordingly, the exhaust pipe injection amount increases dramatically, and as a result, ignition occurs.

It is therefore an object of the present invention to solve the problems described above by providing an exhaust gas purification system with which DPF regeneration can be continued even when deceleration occurs during the DPF regeneration.

To achieve the object described above, the present invention provides an exhaust gas purification system including: a diesel particulate filter disposed in an exhaust pipe of an engine to collect particulate matter; an exhaust gas recirculation device that recirculates exhaust gas from an exhaust manifold to an intake manifold of the engine in accordance with an instructed exhaust gas recirculation opening; a variable nozzle turbocharger which performs turbocharging when a turbine disposed in the exhaust pipe and a compressor disposed in an intake pipe of the engine rotate integrally, a turbocharging amount of which can be adjusted using an actuator; an intake throttle disposed between the turbocharger and the intake manifold to limit an intake air amount in accordance with an instructed intake throttle opening; and a regeneration deceleration period intake/exhaust control unit that, when a vehicle decelerates during regeneration of the diesel particulate filter, increases an exhaust gas flow rate through the exhaust pipe by controlling the opening of the exhaust gas recirculation device and the opening of the intake throttle and adjusting the turbocharging amount of the variable nozzle turbocharger.

When the vehicle decelerates during regeneration of the diesel particulate filter, the regeneration deceleration period intake/exhaust control unit may fully close the opening of the exhaust gas recirculation device.

When the vehicle decelerates during regeneration of the diesel particulate filter, the regeneration deceleration period intake/exhaust control unit may fully open the opening of the intake throttle.

When the vehicle decelerates during regeneration of the diesel particulate filter, the regeneration deceleration period intake/exhaust control unit may increase the turbocharging amount of the variable nozzle turbocharger.

The exhaust gas purification system may further include: an exhaust pipe injector that is disposed upstream of the diesel particular filter in order to inject fuel into the exhaust pipe; and an exhaust pipe injection regeneration control unit that regenerates the diesel particulate filter by controlling fuel injection from the exhaust pipe injector.

The present invention exhibits the following favorable effect.

DPF regeneration can be continued even when deceleration occurs during DPF regeneration.

BRIEF DESCRIPTION OF THE DRAWING

FIG. 1 is a system diagram showing configurations of an engine, an intake/exhaust system, and a fuel injection system of a vehicle to which an exhaust gas purification system according to the present invention is applied.

DETAILED DESCRIPTION

Embodiments of the present invention will be described in detail below on the basis of the attached drawings.

FIG. 1 shows system configurations of an engine, an intake/exhaust system, and a fuel injection system of a vehicle to which an exhaust gas purification system according to the present invention is applied.

First, the configuration of the exhaust system will be described. An exhaust pipe 103 for discharging exhaust gas from an engine 101 into the atmosphere is connected to an exhaust manifold 102 of the engine 101, and an EGR pipe 105 for circulating the exhaust gas from the exhaust manifold 102 to an intake manifold 104 is provided on a furthest upstream side of the exhaust pipe 103. An EGR cooler 106 that cools the exhaust gas and an EGR valve 107 for regulating an EGR amount (or an EGR rate) are provided in the EGR pipe 105. The EGR pipe 105, the EGR cooler 106, and the EGR valve 107 will be referred to collectively as an EGR device 123. The EGR device 123 circulates the exhaust gas from the exhaust manifold 102 to the intake manifold 104 in accordance with an instructed EGR opening.

A turbine 109 of a high pressure stage turbocharger 108 is provided on a downstream side of the exhaust pipe 103, and a turbine 111 of a low pressure stage turbocharger 110 is provided downstream thereof. An exhaust brake valve 112 that closes the exhaust pipe 103 is provided downstream of the turbine 111, and a DPF unit 113 is provided downstream thereof. The DPF unit 113 is constituted by a DOC 114 that advances the oxidation of fuel injected into the exhaust pipe 103 during DPF regeneration, and a DPF 115 that collects PM. An exhaust throttle 116 may be provided downstream of the DPF unit 113, and downstream of the exhaust throttle 116, the exhaust pipe 103 is open to the atmosphere. Although not shown in the drawing, an SCR (Selective Catalytic Reduction) device may be provided in the exhaust pipe 103.

Next, the configuration of the intake system will be described. An intake pipe 117 for taking air into the engine 101 from the atmosphere is connected to the intake manifold 104. A furthest upstream side of the intake pipe 117 is open to the atmosphere, and an air cleaner 118 that removes foreign matter such as dust is provided downstream thereof. A compressor 119 of the low pressure stage turbocharger 110 is provided downstream of the air cleaner 118, and a compressor 120 of the high pressure stage turbocharger 108 is provided downstream thereof. An intercooler 121 that cools intake air turbocharged by the low pressure stage turbocharger 110 and the high pressure stage turbocharger 108 is provided downstream of the compressor 120, and an intake throttle 122 that limits an intake air amount in accordance with an instructed intake throttle opening is provided downstream thereof. Downstream of the intake throttle 122, the intake pipe 117 is connected to the intake manifold 104.

Next, the configuration of the fuel injection system will be described. A piston head 132 is configured to stroke through a cylinder 131, which is shown by cutting away a part of the engine 101. An injector 133 for injecting fuel is attached to the cylinder 131, and an injection port of the injector 133 is disposed above a top dead center position of the piston head 132. Although shown in a simplified form in the drawing, the engine 101 includes a plurality of cylinders 131, and the injector 133 is provided in each cylinder 131. High pressure fuel is supplied to each injector 133 from a common rail 134. Although not shown in detail in the drawing, the injector 133 includes a valve body driven by electromagnetic force from a coil, and the injection port is opened in accordance with a duration (an energization time) of a pulse current for energizing the coil.

A high pressure fuel pipe 136 that supplies fuel at a high pressure (a common rail fuel pressure) from a high pressure pump 135 is connected to the common rail 134. An intermediate pressure fuel pipe 138 that supplies fuel at an intermediate pressure (an exhaust pipe injection fuel pressure), which is higher than atmospheric pressure but lower than the common rail fuel pressure, from a feed pump 137 is connected to the high pressure pump 135. The feed pump 137 takes in fuel from an atmospheric pressure fuel tank 139 via a low pressure fuel pipe 140. The feed pump 137 is coupled to a crankshaft, not shown in the drawing, and rotated in accordance with the engine 101 so as to pump fuel at a pumping force corresponding to an engine rotation speed. The feed pump 137 is thus capable of supplying fuel at an exhaust pipe injection fuel pressure corresponding to the engine rotation speed to the intermediate pressure fuel pipe 138.

In the present invention, an exhaust pipe injector 141 for injecting fuel into the exhaust pipe 103 is provided downstream of the turbine 111 of the low pressure stage turbocharger 110 and upstream of the exhaust brake valve 112. Fuel from the feed pump 137 is supplied to the exhaust pipe injector 141 via the intermediate pressure fuel pipe 138.

A recovery fuel pipe 142 that recovers surplus fuel in the fuel tank 139 is connected respectively to the high pressure pump 135, the common rail 134, and the injector 133.

Next, various sensors will be described.

A water temperature sensor 151 that detects a cooling water temperature, a crank angle sensor 152 that detects an index on the crankshaft, not shown in the drawing, as a crank angle reference position, an oil level sensor 153 that detects a remaining amount of engine oil, and so on are provided in the engine 101. An engine exhaust gas temperature sensor 154 is provided in the exhaust manifold 102. A boost pressure sensor 155 is provided in the intake manifold 104.

A DOC inlet exhaust gas temperature sensor 156 that detects an exhaust gas temperature at an inlet of the DOC 114, a DPF inlet exhaust gas temperature sensor 157 that detects the exhaust gas temperature at an inlet of the DPF 115, and a differential pressure sensor 158 that detects a differential pressure, which is a pressure difference in the exhaust gas between the inlet and an outlet of the DPF 115, are provided in the DPF unit 113. When PM accumulates in the DPF 115, the differential pressure increases in accordance with the increase in the accumulation amount, and therefore a DPF regeneration timing can be determined on the basis of the differential pressure. A temperature of the DPF 115 during DPF regeneration and so on can be confirmed from the DPF inlet exhaust gas temperature detected by the DPF inlet exhaust gas temperature sensor 157.

An exhaust pipe injection fuel pressure sensor 159 that detects the exhaust pipe injection fuel pressure, which is a fuel pressure applied to the exhaust pipe injector 141, is provided in the intermediate pressure fuel pipe 138. A fuel temperature sensor 160 that detects a fuel temperature is provided at an inlet of the high pressure pump 135. A common rail fuel pressure sensor 161 that detects the common rail fuel pressure, which is a fuel pressure applied to the injector 133 of each cylinder 131, is provided in the common rail 134. An air flow sensor (a MAF sensor) 162 that detects a flow rate of the air suctioned into the intake pipe 117 is provided in the intake pipe 117 downstream of the air cleaner 118.

A high pressure stage turbo rotation speed sensor (not shown) that detects a rotation speed of a shaft that connects the turbine 109 to the compressor 120 is provided in the high pressure stage turbocharger 108.

Various other conventional sensors not illustrated in the drawing are provided in the engine 101, the intake/exhaust system, and the fuel injection system.

Next, a configuration of a control system will be described.

The high pressure stage turbocharger 108 is a variable nozzle turbocharger (VNT, also known as a variable geometry turbo VGT and a variable geometry system VGS) that performs turbocharging when the turbine 109 disposed in the exhaust pipe 103 and the compressor 120 disposed in the intake pipe 117 are coupled by the shaft so as to rotate integrally. At this time, a turbocharging amount of the high pressure stage turbocharger 108 can be adjusted using an actuator. More specifically, a nozzle actuator 164 for adjusting an opening area of the turbine 109 is provided upstream of the turbine 109. A turbo controller 165 controls the turbocharging amount or a turbocharging pressure by driving the nozzle actuator 164 while referencing the rotation speed of the shaft, which is detected by the high pressure stage turbo rotation speed sensor 163.

Means for controlling various parts of a vehicle, including fuel injection into the engine 101, are incorporated into an electronic control unit (ECU) 171 in the form of a program. The ECU 171 performs control such as fuel injection control by detecting the engine rotation speed, an accelerator opening, a load torque, an air amount, and so on at all times as engine parameters representing an engine condition. To obtain propulsive force in the engine 101, the ECU 171 performs multi-injection control, in which fuel injection is performed a plurality of times within a single combustion cycle of each cylinder 131 from the injector 133 at an appropriate crank angle. The multi-injection control is used to raise the exhaust gas temperature.

The ECU 171 is provided with an exhaust pipe injection regeneration control unit 172 that performs DPF regeneration by controlling an exhaust pipe injection, and a regeneration deceleration period intake/exhaust control unit 173 which, when the vehicle is decelerated by the engine brake during DPF regeneration by means of an exhaust pipe injection, increases an exhaust gas flow rate through the exhaust pipe 103 by fully closing the opening of the EGR device 123, fully opening the opening of the intake throttle 122, and increasing the turbocharging amount of the high pressure stage turbocharger 108.

DPF regeneration is performed by the ECU 171 every time a traveled distance of the vehicle reaches a predetermined distance and when the differential pressure detected by the differential pressure sensor 158 reaches or exceeds a predetermined value.

An operation of the exhaust gas purification system according to the present invention will now be described.

The ECU 171 starts DPF regeneration when the traveled distance of the vehicle reaches the predetermined distance or when the differential pressure detected by the differential pressure sensor 158 reaches or exceeds the predetermined value.

More specifically, when the exhaust gas temperature at the inlet of the DOC 114, detected by the DOC inlet exhaust gas temperature sensor 156, is lower than an activation temperature of the DOC 114, the ECU 171 increases the exhaust gas temperature to the activation temperature of the DOC 114 by increasing the amount of fuel injected in the multi-injection control.

When the exhaust gas temperature detected by the DOC inlet exhaust gas temperature sensor 156 reaches the activation temperature of the DOC 114, the exhaust pipe injection regeneration control unit 172 controls the exhaust pipe injection. More specifically, the exhaust pipe injection regeneration control unit 172 increases the amount of fuel injected through the exhaust pipe injector 141 when the exhaust gas temperature at the inlet of the DPF 115, detected by the DPF inlet exhaust gas temperature sensor 157, is lower than the incineration temperature of the PM, and reduces the amount of fuel injected through the exhaust pipe injector 141 when the exhaust gas temperature at the inlet of the DPF 115 is sufficiently higher than the incineration temperature of the PM. In so doing, the temperature of the DPF 115 is maintained at the incineration temperature of the PM, and as a result, the DPF 115 is regenerated.

It is assumed that, at this time, the accelerator pedal is released such that the engine brake is activated. Hence, the vehicle is decelerated by the engine brake during DPF regeneration by means of the exhaust pipe injection, and therefore the regeneration deceleration period intake/exhaust control unit 173 increases the exhaust gas flow rate through the exhaust pipe 103 by fully closing the opening of the EGR device 123, fully opening the opening of the intake throttle 122, and increasing the turbocharging amount of the high pressure stage turbocharger 108 above a current level. More specifically, when the EGR valve 107 of the EGR device 123 is fully closed, exhaust gas is no longer recirculated from the exhaust manifold 102 to the intake manifold 104, and therefore all of the exhaust gas from the engine 101 flows downstream through the exhaust pipe 103. Further, when the opening of the intake throttle 122 is fully opened, all of the fresh air turbocharged by the compressor 120 of the high pressure stage turbocharger 108 is supplied to the engine 101. Furthermore, when the turbocharging amount of the high pressure stage turbocharger 108 is increased beyond the current level, the amount of fresh air supplied to the engine 101 increases further. As a result, the exhaust gas flow rate through the exhaust pipe 103 can be increased beyond a current level while taking DPF regeneration into consideration.

The present inventors ascertained that when exhaust gas is retained in the exhaust pipe 103, the fuel from the exhaust pipe injector 141 is ignited in the exhaust pipe 103, leading to an increase in the respective temperatures of the DPF 115 and the DOC 114, but found that when the exhaust gas flow rate is increased, the fuel is not ignited in the exhaust pipe 103. Therefore, when the exhaust gas flow rate through the exhaust pipe 103 is increased by the control of the regeneration deceleration period intake/exhaust control unit 173, as described above, the fuel from the exhaust pipe injector 141 is prevented from being ignited in the exhaust pipe 103. As a result, the exhaust pipe injection can be continued.

Hence, according to the present invention, when the vehicle is decelerated by the engine brake during DPF regeneration by means of the exhaust pipe injection, the exhaust gas flow rate through the exhaust pipe 103 is basically increased. During engine braking, the temperature of the exhaust gas discharged from the engine 101 is low, and therefore, when the exhaust gas flow rate is increased, the temperature of the DOC 114 is likely to decrease correspondingly. By controlling the turbocharging amount of the high pressure stage turbocharger 108 to a predetermined value so that the turbocharging amount is not increased excessively, however, an early reduction in the temperature of the DOC 114 is prevented.

When the engine braking continues for a long time, the DOC 114 is cooled by the exhaust gas so as to fall below the activation temperature. To prevent white smoke generation at this time, the exhaust pipe injection is stopped and the temperature maintaining mode described above is set. Hence, according to the present invention, the exhaust pipe injection is continued only during a period where the temperature of the DOC 114 is maintained at the activation temperature. For example, when the accelerator pedal is released such that the engine brake is activated following vehicle travel in which the engine 101 is operated at full load, it is known that the temperature of the DOC 114 remains at the activation temperature for a while (approximately 30 seconds, for example, although the period differs depending on the vehicle type) following the start of the engine brake operation. Hence, the exhaust pipe injection can be continued while the temperature of the DOC 114 remains at the activation temperature. Note that a full load operation is an operation in which an accelerator opening is large, the engine rotation speed is high, and an output torque is large.

Therefore, in a case where, for example, DPF regeneration by means of an exhaust pipe injection is started while the vehicle accelerates on an expressway, travels uphill, or the like, and in this condition, the vehicle comes to a downhill slope or draws near to a preceding vehicle such that the accelerator pedal is released and engine braking starts, the DPF regeneration is continued.

As described above, with the exhaust gas purification system according to the present invention, when the vehicle is decelerated by the engine brake during DPF regeneration by means of an exhaust pipe injection, the exhaust gas flow rate through the exhaust pipe 103 is increased by fully closing the opening of the EGR device 123, fully opening the opening of the intake throttle 122, and increasing the turbocharging amount of the high pressure stage turbocharger 108. As a result, fuel ignition in the exhaust pipe 103 can be prevented, and the DPF regeneration can be continued.

Note that in this embodiment, only a case in which the engine brake is activated was described, but the accelerator pedal is also released during a foot brake operation, and therefore the present invention can also be applied to this case. During use of an exhaust brake, however, the exhaust pipe injector 141 is shut off from the DPF unit 113 by the exhaust brake valve 112, and therefore the exhaust pipe injection is not performed to prevent an exhaust pressure from becoming excessive.

The invention claimed is:

1. An exhaust gas purification system for a vehicle engine, comprising:
   a diesel particulate filter disposed in an exhaust pipe of the engine to collect particulate matter;
   an oxidation catalyst disposed in the exhaust pipe upstream of the diesel particulate filter;
   an exhaust gas recirculation device that recirculates exhaust gas from an exhaust manifold to an intake manifold of the engine via an amount of opening of the exhaust gas recirculation device;
   a turbocharger, a turbocharging amount of which is adjusted using an actuator;
   an intake throttle disposed between the turbocharger and the intake manifold to limit an intake air amount in accordance with an instructed intake throttle opening; and
   a regeneration deceleration period intake/exhaust controller that, when the vehicle decelerates during regeneration of the diesel particulate filter, but is still moving, is configured to increase an exhaust gas flow rate through the exhaust pipe by controlling the amount of opening of the exhaust gas recirculation device and an amount of opening of the intake throttle and adjusting the turbocharging amount, and when a temperature of the oxidation catalyst falls below a temperature necessary to activate regeneration, is configured to set a temperature maintaining mode in which the amount of opening of the exhaust gas recirculation device is increased.

2. The exhaust gas purification system according to claim 1, wherein when the vehicle decelerates during regeneration of the diesel particulate filter, the regeneration deceleration period intake/exhaust control unit fully closes of the exhaust gas recirculation device.

3. The exhaust gas purification system according to claim 1, wherein when the vehicle decelerates during regeneration of the diesel particulate filter, the regeneration deceleration period intake/exhaust control unit fully opens the intake throttle.

4. The exhaust gas purification system according to claim 2, wherein when the vehicle decelerates during regeneration of the diesel particulate filter, the regeneration deceleration period intake/exhaust control unit fully opens the intake throttle.

5. The exhaust gas purification system according to claim 1, wherein when the vehicle decelerates during regeneration of the diesel particulate filter, the regeneration deceleration period intake/exhaust control unit increases the turbocharging amount.

6. The exhaust gas purification system according to claim 2, wherein when the vehicle decelerates during regeneration of the diesel particulate filter, the regeneration deceleration period intake/exhaust control unit increases the turbocharging amount.

7. The exhaust gas purification system according to claim 3, wherein when the vehicle decelerates during regeneration of the diesel particulate filter, the regeneration deceleration period intake/exhaust control unit increases the turbocharging amount.

8. The exhaust gas purification system according to claim 4, wherein when the vehicle decelerates during regeneration of the diesel particulate filter, the regeneration deceleration period intake/exhaust control unit increases the turbocharging amount.

9. The exhaust gas purification system according to claim 1, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

10. The exhaust gas purification system according to claim 2, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

11. The exhaust gas purification system according to claim 3, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

12. The exhaust gas purification system according to claim 4, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

13. The exhaust gas purification system according to claim 5, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

14. The exhaust gas purification system according to claim 6, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

15. The exhaust gas purification system according to claim 7, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

16. The exhaust gas purification system according to claim 8, further comprising:
- an exhaust pipe injector that is disposed upstream of the diesel particulate filter in order to inject fuel into the exhaust pipe; and
- an exhaust pipe injection regeneration control unit that regenerates the diesel particulate filter by controlling fuel injection from the exhaust pipe injector.

* * * * *